(12) United States Patent
Perissinotto et al.

(10) Patent No.: US 9,080,643 B2
(45) Date of Patent: Jul. 14, 2015

(54) TENSIONING DEVICE WITH DAMPING CHANNEL IN THE FLUID SUPPLY SYSTEM

(71) Applicant: IWIS MOTORSYSTEME GMBH & CO., KG, Munich (DE)

(72) Inventors: Renzo Perissinotto, Dachau (DE); Ulrich Schelzig, Munich (DE)

(73) Assignee: IWIS MOTORSYSTEME GMBH & CO., KG, Munich (DE)

( * ) Notice: Subject to any disclaimer, the term of this patent is extended or adjusted under 35 U.S.C. 154(b) by 180 days.

(21) Appl. No.: 13/725,297

(22) Filed: Dec. 21, 2012

(65) Prior Publication Data
US 2013/0178317 A1 Jul. 11, 2013

(30) Foreign Application Priority Data
Dec. 23, 2011 (DE) .......................... 10 2011 122 185

(51) Int. Cl.
*F16H 7/08* (2006.01)
(52) U.S. Cl.
CPC ............ *F16H 7/0836* (2013.01); *F16H 7/0831* (2013.01); *F16H 2007/0806* (2013.01); *F16H 2007/0812* (2013.01); *F16H 2007/0817* (2013.01); *F16H 2007/0893* (2013.01)
(58) Field of Classification Search
CPC ....... F16H 7/08; F16H 7/0829; F16H 7/0831; F16H 7/0834; F16H 7/0836; F16H 7/0812; F16H 7/1209; F16H 7/1218; F16H 7/1227; F16H 7/1236; F16H 7/0848; F16H 2007/0802; F16H 2007/0806; F16H 2007/0812; F16H 2007/084; F16H 2007/0817; F16H 2007/0893; F16H 2007/0891; F16H 2007/0859

USPC .......................... 474/110, 111, 140, 109, 101
See application file for complete search history.

(56) References Cited

U.S. PATENT DOCUMENTS

| 5,643,117 A | 7/1997 | Dembosky |
| 8,814,734 B2 * | 8/2014 | Perissinotto et al. ......... 474/110 |
| 2010/0130320 A1 | 5/2010 | Kitano |
| 2012/0135831 A1 * | 5/2012 | Perissinotto et al. ......... 474/110 |

FOREIGN PATENT DOCUMENTS

| DE | 4311056 C1 | 7/1994 |
| DE | 202007002456 U1 | 7/2008 |
| DE | 202009003615 U1 | 7/2010 |
| EP | 1602857 A2 | 12/2005 |
| WO | WO 2008/101526 A1 | 8/2008 |

OTHER PUBLICATIONS

European Search Report issued Mar. 27, 2013 in EP Application No. 12003979.7.

* cited by examiner

*Primary Examiner* — Sang Kim
*Assistant Examiner* — Juan Campos, Jr.
(74) *Attorney, Agent, or Firm* — Baker and Hostetler LLP

(57) ABSTRACT

The damping device of the tensioning device has at least one damping channel that is open in both flow directions as a component of the fluid supply in such a way that during operation at least a portion of the supply stream is fed through the at least one damping channel into the pressure reservoir, and the damping device and the venting device are coupled with each other by fluid engineering means such that a drainage flow from the pressure reservoir occurs via the damping device and the venting device in combination, and the supply flow occurs predominantly independently of the venting device.

18 Claims, 12 Drawing Sheets

TENSIONING DEVICE WITH DAMPING CHANNEL IN THE FLUID SUPPLY SYSTEM

CROSS-REFERENCE TO RELATED APPLICATION

This application claims priority to foreign German patent application No. DE 10 2011 122 185.2, filed on Dec. 23, 2011, the disclosure of which is incorporated by reference in its entirety.

FIELD OF THE INVENTION

The present invention refers to a tensioning device for a flexible drive device, such as chains or belts, with a housing, a tensioning piston that slides inside the housing, a hydraulic fluid pressure reservoir configured between the housing and the tensioning piston, a fluid supply arranged in the housing to supply the pressure reservoir with hydraulic fluid, a damping device that damps the retracting motion of the tensioning piston, where said damping device has a physical fluid connection to the pressure reservoir, and a venting device that is arranged on the tensioning piston or between the tensioning piston and housing, where said venting device has a physical fluid connection to the pressure reservoir.

BACKGROUND AND SUMMARY OF THE INVENTION

In most tensioning devices of this kind, the damping device is created by the presence of a leakage gap between the housing and the tensioning piston, where the leakage gap permits a controlled stream of leaking hydraulic fluid to flow to the outside. In these cases, the size of the leakage gap determines the expected damping characteristic of the tensioning device. These tensioning devices are typically connected to the engine oil hydraulic systems of a combustion engine, because these are primarily used on timing drives, in particular chain-based timing drives. This timing drive connects the crankshaft to one or several camshafts. In addition to the system based motor-oil throughput through the leakage gap, the disadvantage of this type of leakage gap damping also consists of the fact that the hydraulic fluid can incrementally escape through the leakage gap if the pressure reservoir is not pressurized. To limit the amount of escaping oil, the pressure reservoir is typically equipped with a packing. Moreover, most embodiments employ a helical compression spring between the housing and the tensioning piston. The compression spring provides a certain minimum pre-tension for the tensioning device, even when the pressure reservoir is not pressurized. Furthermore, air can accumulate in the pressure reservoir, in particular when the combustion engine is not in operation. This air would negatively impact the function of the tensioning device, because the air has a different compression behavior than the hydraulic fluid. For this reason, a venting device is proposed by which the air enclosed in the pressure reservoir can exhaust to the outside, in particular during the engine startup. Due to the packing, the oil quantity to be refilled is held to a minimum, for instance when the engine starts. But there are significant efforts underway to reduce the oil throughput through tensioning devices of this kind, not the least of which is driven by the desire to use smaller oil pumps.

The object of the present invention is therefore to provide a tensioning device of the initially described type that is able to reduce the hydraulic oil throughput during operation.

A tensioning device according to the class is configured in such a way that the damping device has at least one damping channel that is open in both flow directions as a component of the fluid supply, where at least a portion of the supply flow during operation is fed through the at least one damping channel into the pressure reservoir. Furthermore, the damping device and the venting device are coupled to each other in such a way that the drainage flow from the pressure reservoir occurs via the damping device and the venting device in combination, and the supply flow largely occurs independently from the venting device. At least a portion of the damping function is therefore provided by at least one damping channel (choke channel) that forces the hydraulic fluid back into the fluid supply during the damping process. The channel shape ensures that this process is choked and opposes the pressure of the oil supply. The oil volume used for the damping function is therefore not lost, but is readily available in the fluid supply to be fed into the pressure reservoir. The damping device and the venting device therefore do not typically form a structural unit, but instead operate in conjunction with the pressure reservoir in different locations. In the predominant number of cases, the venting action will occur on the tensioning piston in the known manner, while the damping device is directly connected to the hydraulic fluid supply via the damping channel. The venting device plays no significant role in feeding the supply flow. Of course, the venting device is equipped with a certain intake capacity for hydraulic fluid, which is sucked back into the pressure reservoir when vacuum is created in the pressure reservoir. But the venting device has no connection to the fluid supply in the true sense of the word. According to the invention, the inflowing share of hydraulic fluid due to the intake capacity of the venting device should not exceed 2%, preferably not exceed 1% of the total inflow volume into the pressure reservoir.

The venting device that is in a physical fluid connection with the pressure reservoir preferably vents independently from the at least one damping channel. In many cases the venting function is performed via the tensioning piston. For instance, designs are known with a vent bore arranged on the piston head of the tensioning piston, where said vent bore has a physical fluid connection to the pressure reservoir with the packing placed in between. To accomplish this, the packing can provide corresponding paths that are adjusted for a venting function. But the packing can also provide an additional damping function between the vent bore and the pressure reservoir, where paths and possibly storage cavities exist with sufficient volume to store hydraulic fluid. The designer then has several options on the tensioning device of influencing the damping properties, for instance on the supply insert and/or on the packing. A preferred method for this is the vent device on the tensioning piston. In accordance with the preferred embodiments, the share of the damping device of the total damping action of the tensioning piston should be at least 50%, preferably at least 60%.

Since at least a portion of the damping function occurs inside the tensioning device, and, for this purpose, no oil leaks to the outside that must be reconveyed by the oil pump, the gap optimization between the tensioning piston and the housing can be improved with respect to oil loss as a step toward furthering the design. This gap can play no role, or only a subordinate role, for any favorable advancements of the damping properties. For the purposes of the invention it shall be regarded as sufficient that the damping device according to the invention by means of the at least one damping channel as a component of the fluid supply shall have more than a 50% share of the combined total damping function of the damping device and leakage gap, with preference given to more than 80% and further preference given to more than 95%. Preference is given to the use of an economically sensible clearance fit between the tensioning piston and the housing, which must, however, provide an adequate seal regarding the leakage stream. An advantage in this regard is also that a tighter fit of this kind allows the use of a reduced guide length between the tensioning piston and the housing. Additional sealing can be provided, for instance by means of an O-ring. A significant advantage of the invention is that the required hydraulic volume is reduced because the fluid volume required for damping is at least partially available inside the tensioning device. This reduced hydraulic fluid consumption also addresses under-supply problems. Standardizing manufacturing dimensions for pistons and housings (in particular piston diameters and housing bore diameters) permits standardized piston housings of this kind for a variety of applications since the damping function can then be adjusted at least in part by the respective shape design of the at least one damping channel.

The venting device measures according to the invention must be differentiated. Said venting devices were specifically developed for the overhead installation of tensioning devices. For instance, EP 1602857 B1 reveals a tensioning device with a specially configured check valve housing that contains a choked bypass for venting into the oil supply channel. While such a configuration may also have an impact on the damping properties of the tensioning device, the supply of new hydraulic oil into the pressure reservoir is most likely exclusively provided via the open check valve due to the adjusted choke effect of the medium air. A similar venting design for overhead tensioning device installations is also disclosed by U.S. Pat. No. 5,643,117. According to this document, a special choke disc is used as a check valve mount. However, in both known designs, new hydraulic fluid is supplied primarily through the open check valve. No involvement of the venting design in this inflow is described. In contrast to these known designs, the invention also permits embodiments where the tensioning piston presses toward the top. In addition, in this known design, the exhausted air remains in the pressurized supply path, which can lead to problems.

In accordance with a preferred embodiment, the fluid supply can be equipped with a supply insert that is inserted into the housing with an accurate fit, where the at least one damping channel is arranged between the supply insert and the housing. By employing such an insert, the at least one damping channel can be easily created and also varied. This permits the use of simple methods to influence the damping properties of the damping device by employing a supply insert that matches the desired application.

The housing can be preferably configured with a receiving bore in which the tensioning piston can be located in a sliding manner, where the supply insert is seated with an accurate fit at the base of the receiving bore, and the at least one damping channel is arranged between the exterior surface of the supply insert and the interior surface of the receiving bore. This permits the supply insert to be conveniently inserted into the receiving bore from the front before the tensioning piston is inserted into the housing. The insertion with an accurate fit permits the easy attainment of a suitably sealed damping channel. Ideally, the supply insert could be pressed into the receiving bore.

Yet another embodiment envisions that the supply insert is configured with a first section and a second, larger diameter section, where the at least one damping channel is shaped into the second section, and a flow gap is formed between the first section and the housing, where the flow gap is a component of the fluid supply. This permits the receiving bore diameter to remain unchanged, while the shape of the supply insert creates a flow gap that feeds the hydraulic fluid to the at least one damping channel. Shaping the at least one damping channel into the supply insert simplifies the manufacturing process as a whole. For instance, this certainly provides for the option to manufacture the supply insert as an injection molded part.

Furthermore, the housing can feature a supply bore that is connected to an external oil supply as a component of the fluid supply and terminates in the flow gap between the housing and the supply insert. This can be in the form of a simple cross bore to the receiving bore for the tensioning piston, so that the supply insert is primarily responsible for defining the essential shape of the adjoining flow channels.

In order to achieve sufficient damping and to provide damping channels of sufficient length, the at least one damping channel can run circumferentially along the outside diameter of the supply insert in a helical manner. Depending on the selected pitch, a partial circumferential design may be completely sufficient in this case.

A minimum of two damping channels on the supply insert is the preferred embodiment, where the regions between the damping channels provide a nearly complete contact seal with the housing. This ensures that the damping action is accurately determined by the damping channels, and that no leakage flow occurs past the supply insert.

In accordance with a preferred embodiment, all supply streams originating from the oil supply can be supplied by the damping channel into the pressure reservoir. The term "all supply streams" refers to the hydraulic fluid supply stream fed from outside of the tensioning device. Other internal storage mechanisms may additionally be employed inside the tensioning device. Conversely, this means that the supply of the pressure reservoir with hydraulic fluid is performed without a check valve because the damping channel must be available at all times for the damping and the supply functions. The tensioning device must therefore be regarded as devoid of a check valve for this supply purpose within the fluid supply area. The damping properties are naturally adjusted by selecting the appropriate number, size, cross-section shapes and trajectory shapes of one or several damping channels.

Alternatively, an embodiment can also be equipped with a fluid supply that has a check valve that is actuated hydraulically in parallel to the damping channel. Depending on the configuration of the check valve, the supply of hydraulic fluid into the pressure reservoir can occur very quickly and with relatively low flow resistance, while very good damping action is provided by means of a damping channel that only provisions against a large flow resistance during the retraction stroke of the tensioning piston, during which the check valve is closed.

It is therefore advantageous for such a version if the inflow into the pressure reservoir primarily occurs by means of the check valve. To do so, a design can be envisioned where the flow resistance of the at least one damping channel and the flow resistance of the check valve are jointly adjusted in the opening direction in such a way that at least for a tensioning piston stroke frequency range of 50 to 200 Hz more than 90%, preferably more than 94%, of the supply flow is provided to the pressure reservoir via the check valve. The tensioning piston stroke frequency was referenced for the above consideration because this also incorporates the dynamic behavior of the check valve into the consideration. Namely, as the stroke frequency increases, the inflow via the check valve is reduced slightly, whereas the inflow via the at least one damping channel is increased slightly. For example, in one version at a stroke frequency of 50 Hz, the share of the supply flow through the check valve is at 97%, whereas it is only 95% at 200 Hz. Correspondingly, the share of the supply flow through the at least one damping channel changes from 3 to 5%.

Furthermore, a design can be envisioned where the flow resistance of the at least one damping channel and the flow resistance of the venting device are jointly adjusted in such a way that at least for a tensioning piston stroke frequency range of 50 to 200 Hz, no more than 50%, preferably no more than 45%, of the drainage flow can be evacuated from the pressure reservoir via the venting device. The damping action should therefore primarily be determined by the at least one damping channel (damping share greater than 50%). But due to the dynamic behavior of the check valve, said check valve participates in the drainage flow as the tensioning piston stroke frequency increases. Generally, at this tensioning piston frequency range, the share of the check valve is less than the share of the at least one damping channel, as well as the share through the venting device, but the check valve nevertheless plays a noteworthy role for the overall consideration across the range indicated herein. The share of the ventilating device declines with increasing tensioning piston stroke frequency in the indicated range (starting at 50 Hz), therefore initially resulting in an increase of the share of the drainage flow through the at least one damping channel. In many cases, this is likely to apply up to a stroke frequency of 100 Hz. Beyond this, the check valve increasingly assumes a share of the drainage flow, so that the relative share of the drainage flow that is evacuated through the damping channel declines again. There certainly are versions for which the volume flow evacuating via the check valve is 13% of the entire drainage flow at a tensioning piston stroke frequency of 200 Hz. But at low frequencies, the adjustments between the at least one damping channel and the venting device is of material significance, since these distribute the damping action share among each other. However, the share of the at least one damping channel is mostly greater than 50% at the stroke frequency range indicated here. This ensures that even if a check valve is used, the correspondingly desired savings effects regarding the oil throughput are attained.

An advantageous embodiment envisions that the supply insert is manufactured from a material softer than the material of the tensioning piston. By selecting a suitable material, the supply insert can also serve as an impact damper for the tensioning piston. This would limit or possibly avoid undesirable noise. Moreover, the material of the supply insert can also be softer than that of the housing. This permits the supply insert to be pressed into the receiving bore, without the receiving bore being subject to undesirable surface modifications or damage to the interior surface.

Based on a particularly favorable embodiment, the damping function by means of a leakage gap between the tensioning piston and the housing is omitted completely. For this purpose, a slip seal can be arranged in the housing between the tensioning piston and the receiving bore. The damping function can then be performed completely via the at least one damping channel, or additional measures can be taken, e.g. due to a specially configured packing, which also contributes to the damping function.

The invention furthermore refers to a tensioning device series, encompassing at least one first and at least one second tensioning device in accordance with one of the claims 2 through 12, where the first and second tensioning devices each have a housing bore to accommodate the tensioning piston and have a tensioning piston of an identically dimensioned standardized diameter, and the damping properties of the damping device of the at least one first tensioning device differ from those of the at least one second tensioning device, where the differing damping properties are achieved by means of differently dimensioned and/or designed supply inserts.

A most favorable outcome for such a tensioning device series is that the housing and the tensioning piston are correspondingly identical in their configuration, while primarily a different supply insert is used for the respectively desired damping properties. This can be taken so far that all components of the first and second tensioning devices are identical with the exception of the supply insert. This could result in significant cost reductions, while the damping function can be individually adapted to various application requirements. The damping function can be adjusted by exchanging the supply insert, particularly when employing timing chain drives on combustion engines. Such a measure represents a significant advantage, given the cost pressures typical for this field. Moreover, the supply insert of this tensioning device exhibits the low to non-existent hydraulic fluid losses expected from the design according to the invention. Of course, the series can be extended at will, so that the series can contain even more than two tensioning devices with different damping functions.

In addition, the invention refers to a circumferential engagement device transmission with a flexible drive device, such as a chain or belt, at least two drive wheels that are functionally engaged with the drive device, and a tensioning device in accordance with one of the claims 1 through 12. In the case of a chain drive, the tensioning device applies pressure to a pivoting tensioning bar that contacts the chain, thereby tensioning the chain between the transmission gears. For a circumferential engagement device transmission of this type, the supply of hydraulic fluid is simpler than in the comparable state of the art.

The invention also refers to a circumferential engagement device transmission series, encompassing at least one first circumferential engagement device transmission and at least one second circumferential engagement device transmission, where the first circumferential engagement device transmission is equipped with a first tensioning device of a tensioning device series in accordance with claim 13, and the second circumferential engagement device transmission is equipped with a second tensioning device that has a different damping characteristic of a tensioning device series in accordance with claim 13. Costs can be reduced in this case by employing standardized components. But the advantages of the employed tensioning devices also have a positive impact on the operation of the circumferential engagement device transmission series.

The invention can be combined with other measures to reduce oil throughput. For instance, the venting device can provide expanded storage capacity for hydraulic fluid. An advantageous embodiment for this could be a corresponding design of a packing in the interior of the tensioning piston, so that a suitable venting action and hydraulic fluid storage capacity can be rendered at the same time. The venting device then typically also acts increasingly as a damping device. In the most favorable case, the hydraulic fluid travels back and forth in the working space of the tensioning device within the venting device, without an inordinate amount of hydraulic fluid leaking via the venting device opening. This requires exacting tuning of the choke channels and/or storage reservoirs within the venting device, especially in consideration of the damping device in accordance with this invention.

In addition to this, the option exists to create different configurations. For instance, the venting device can be equipped with a pressure relief valve that opens at a certain pressure level in the pressure reservoir in order to relieve pressure peaks. Typically, the venting action is rendered as a bypass to a spring-loaded valve body that provides the pressure relief function. Alternatively, or additionally, a reverse lock can be provided on the tensioning device, which prevents the retracting motion of the tensioning piston beyond a certain point. Typically, these reverse locks are self-adjusting devices in the form a ratchet system, in order to compensate wear in the flexible drive devices and to effect a shift of the operating parameters of the tensioning device.

BRIEF DESCRIPTION OF THE DRAWINGS

The following is a detailed description of the invention based on drawings. Shown are.

DETAILED DESCRIPTION

Figure 1:
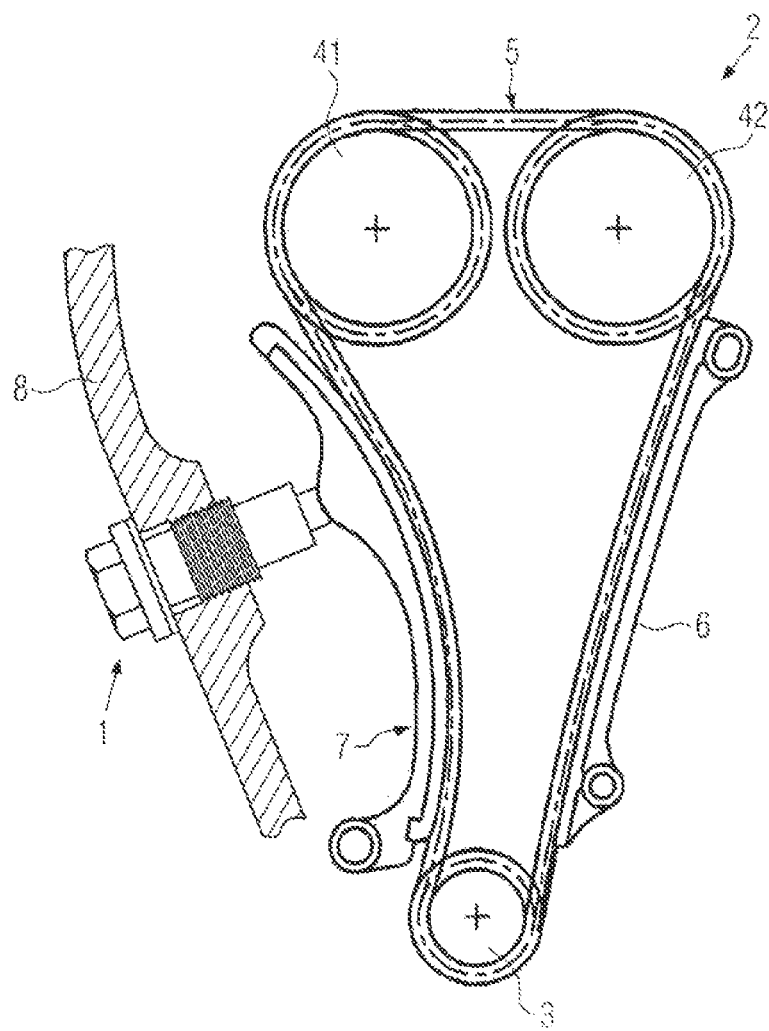
FIG. 1 a schematic diagram of a chain drive with a screw-in chain tensioner.

The tensioning device 1 in the present case is employed for a chain drive 2. The chain drive 2 is a timing chain drive on a combustion engine. The chain drive 2 encompasses a crankshaft chain sprocket 3, two camshaft chain sprockets in a side-by-side arrangement, 4.1 and 4.2. A timing chain 5 is engaged around the chain sprockets 3, 4.1 and 4.2 as a flexible drive device. A guide rail 6, along which the timing chain 5 glides, is located between the crankshaft chain sprocket 3 and the camshaft chain sprocket 4.2. A pivoting tensioning rail 7, to which pressure can be applied by means of the tensioning device 1, is located on the opposite side between the crankshaft chain sprocket 3 and camshaft chain sprocket 4.1. The guide rail 6 and the tensioning rail 7 are equipped with a carrier element on which a gliding pad has been arranged. In the present case, the tensioning device 1 is a screw-in chain tensioner that is screw-mounted into a component of the engine block 8, and presses on the tensioning rail 7 with its tensioning piston 9, so that the tensioning rail 7 is pressed onto the timing chain 5 with a predetermined force.

Figure 2:
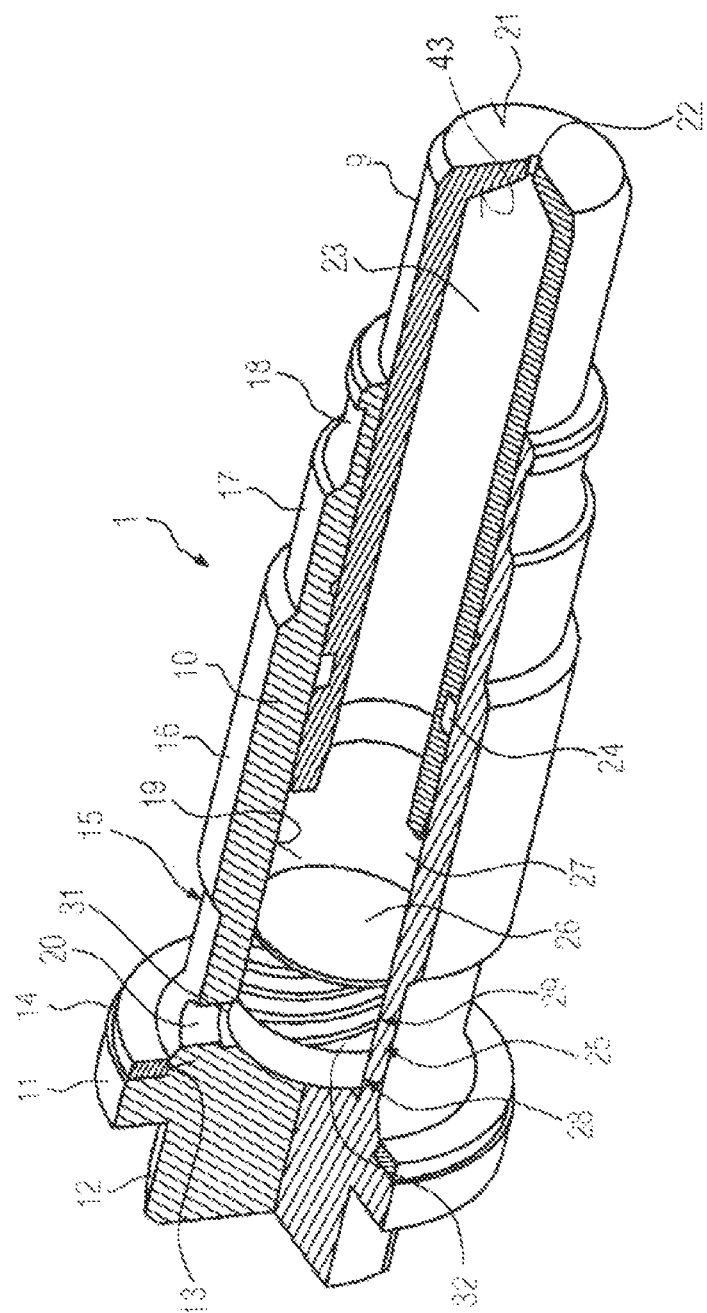
FIG. 2 a perspective cross-section view of a first embodiment of the screw-in chain tensioner from FIG. 1, where the supply insert is not shown as a cross-section, FIG. 3 the back end of the chain tensioner from FIG. 2 in a perspective cross-section diagram, where the supply insert is also shown as a corresponding cross-section, FIG. 4 a perspective diagram of the supply insert from FIG. 2 seen from the front, showing the front face, FIG. 5 the supply insert from FIG. 4 in a perspective diagram seen from the back, FIG. 6 a perspective drawing of a tension spring for use in a screw-in chain tensioner per FIG. 2, FIG. 7 a perspective drawing of a packing for use in a screw-in chain tensioner per FIG. 2, FIG. 8 a diagram regarding the distribution of the drainage flow from the pressure reservoir as a function of various piston stroke frequencies for the first embodiment, FIG. 9 a perspective cross-section view of a second embodiment of the screw-in chain tensioner from FIG. 1, where the supply insert is not shown as a cross-section, FIG. 10 the back end of the chain tensioner from FIG. 2 in a perspective cross-section diagram, where the supply insert is also shown as a corresponding cross-section, FIG. 11 a perspective diagram of the supply insert from FIG. 9 seen from the front, showing the front face, FIG. 12 the supply insert from FIG. 11 in a perspective diagram seen from the back, FIG. 13 a diagram regarding the distribution of the drainage flow from the pressure reservoir as a function of various piston stroke frequencies for the second embodiment, FIG. 14 a diagram showing the distribution of the inflow into the pressure reservoir as a function of various piston stroke frequencies for the second embodiment, FIG. 15 a first embodiment of a tensioning device series in a perspective cross-section diagram, where the supply inserts are not shown as cross-sections, FIG. 16 a second embodiment of a tensioning device series in a perspective cross-section diagram, where the supply inserts are not shown as cross-sections, and FIG. 17 a schematic diagram of a circumferential engagement device transmission series.
Figure 3:
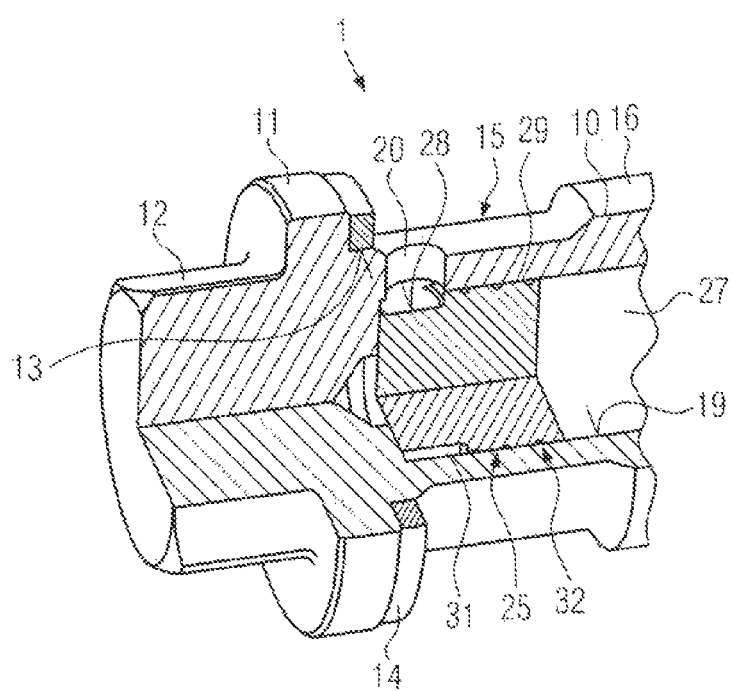

Based on FIGS. 2 and 3, the following will now provide a more detailed description of the configuration of the first embodiment of this screw-in chain tensioner. The tensioning device 1 encompasses a housing 10, which is configured as a turned/milled component. The housing 10 is composed of a head section and a screw-interface section. The head section is equipped with an alignment flange 11 and a rear facing hex-shaped key 12 that a tool can engage to screw the device into the housing 10. A seal seat 13 is configured along the bottom of the flange 11, which seats a seal ring 14 having a rectangular cross-section. A supply ring groove 15 extends from the seal seat 13. In the screw mounted condition, said supply ring groove 15 communicates with an oil supply in the engine block 8, so that engine oil can be fed into this supply ring groove 15. A threaded section, which can be screwed into a matching counter-thread in the engine block 8, extends from this supply ring groove 15. The front cylindrical section 17 is equipped with another ring groove 18, which, depending on the configuration, can be employed as a receiver for a component of a reverse travel lock.

The housing 10 is equipped with a cylindrical receiving bore 19 that is open toward the front. The tensioning piston 9 is inserted into said cylindrical receiving bore 19 with a mostly accurate fit and is able to travel back and forth. A radially oriented supply bore 20 is provided between the receiving bore 19 and the supply ring groove 15. The tensioning piston 9 is equipped with a contact face 21, that has a co-axially integrated vent opening 22. With the exception of the front section, the tensioning piston 9 is configured as a hollow cylinder, thus providing space to accept additional components that are not shown. Among others, this generally includes a packing 38 (FIG. 7). The packing 38 is mushroom shaped with a mushroom shaped head 39 and a cylindrical extension 40 extending from the mushroom shaped head 39. The mushroom shaped head 39 of said packing 38 is pressed against the conical terminating wall 43 of the bore 23 in the tensioning piston 9, thus forming a vent channel 41 that connects to the flow from the vent opening 22. Furthermore, the interior is equipped with a compression spring 42 (FIG. 6) that is supported at the front end of the back side of the head of the packing 38, where the cylindrical extension 40 is arranged in the interior of the compression spring 42. Furthermore, the tensioning piston 9 is equipped with a locating groove 24 for a seal ring, therefore largely eliminating leakage flows between the tensioning piston 9 and the receiving bore 19 of the housing 10. For reasons of clarity, the packing 38 and the compression spring 42 are not shown in FIGS. 2 and 3. However, these do represent components of the tensioning device 1 because they improve the properties of the tensioning device 1 during the initial unpressurized condition and as the pressure builds, and to provide a minimum tension force when a lower fill volume is required for the pressure reservoir 27, which is advantageous during the starting procedure of a combustion engine.

Figure 4:
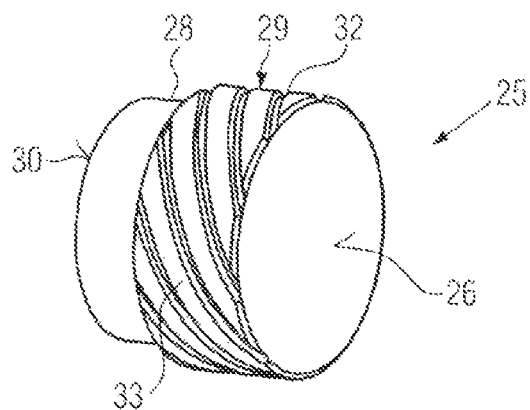
Figure 5:
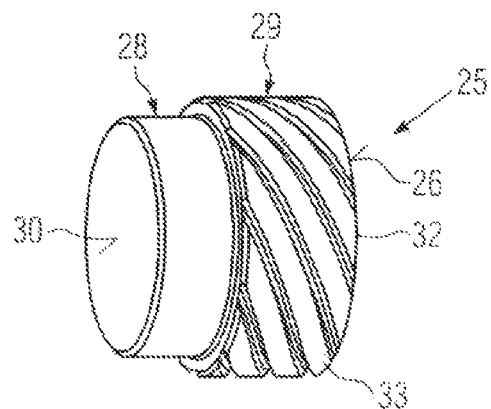

A cylindrical supply insert 25 is located at the base of the receiving bore 19. A first embodiment of this supply insert 25 is even more readily apparent in FIGS. 4 and 5. The supply insert 25 consists of a material that is softer than the material of the tensioning piston 9. The tensioning piston 9 is mostly made of steel. The supply insert 25 can be made of brass, aluminum, or plastic material. This also provides a certain impact protection for the tensioning piston 9 on the supply insert 25. Depending on the material combination, this can result in significant noise reduction as well. The compression spring, which is not shown, is then supported on the front face 26 of the supply insert 25. A pressure reservoir 27 is formed between the supply insert 25 and the tensioning piston 9. The compression spring—not shown—and the packing—not shown—ensure a suitable reduction of the pressure reservoir volume.

The supply insert 25 has a first section 28 and a second, larger diameter section 29. The front face 30 of the first section is in contact with the base of the receiving bore 19. A flow gap is formed between the circumferential surface of the first section 28 and the interior surface of the receiving bore 19, where the supply bore 20 terminates in said flow gap. The cylindrical second section 29 is inserted into the receiving bore 19 with an accurate fit, and is equipped along its circumferential surface with a total of ten helically shaped damping channels 32 in the form of damping grooves. In the present case, the damping channels 32 have a trapezoidal cross-section. The damping channels 32 further have a depth that is significantly less than the step between the first section 28 and the second section 29. All damping channels 32 have the same pitch. The regions 33 between the damping channels 32 form a contact seal with the interior wall of the receiving bore 19. The supply insert 25 can be pressed into the receiving bore 19 for this purpose. This configuration does not call for a check valve to feed hydraulic fluid to the pressure reservoir 27. All hydraulic fluid is forced to flow through the damping channels 32 into the pressure reservoir 27. The damping channels 32 have a direct physical flow connection with the flow gap 31 for this purpose. It goes without saying that the shape of the damping channels 32 has material influence on the damping properties of the tensioning device 1. A large number of options exist to influence the damping properties. To name a few, this includes the cross-sectional shape of the damping channels, the dimensions of the damping channels, the number of damping channels, as well as the trajectory along the circumferential surface of the supply insert 25.

The following briefly explains the operational and functional principles of the tensioning device 1 described above.

When the tensioning piston 9 of the tensioning device 1 extends in the screwed-in condition, this is normally accomplished by hydraulic fluid that is fed by the engine oil hydraulic systems from the oil pump. Oil is fed from the engine block 8 into the supply ring groove 15 and flows through the supply bore 20 and the flow gap 31 underneath the second section 29 of the supply insert and envelops the first section 28. From there, the hydraulic fluid travels into the damping channels 32, flows through said damping channels 32 and then flows into the pressure reservoir 27. The total flow cross-section through the damping channels 32 must be sufficiently large for this to happen.

In the reverse case, when the tensioning piston 9 retracts in response to a vibration movement of the tensioning rail 7, the retracting motion must be damped. The tensioning piston 9 now forces hydraulic fluid back out from the pressure reservoir 27 and through the damping channels 32. This process of forcing back of course acts against the existing fluid pressure provided by the hydraulic fluid supply. The damping properties for this process can be suitably influenced by the design of the supply insert 25 and, in particular, the damping channels 32.

Figure 6:
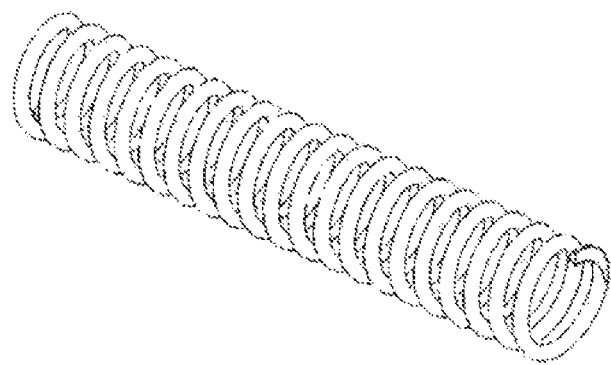
Figure 7:
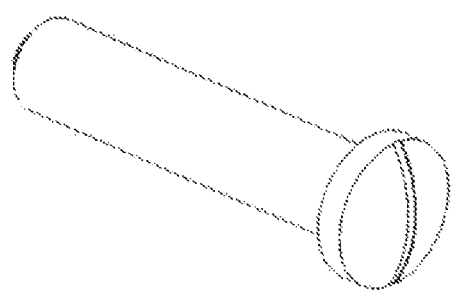
Figure 8:
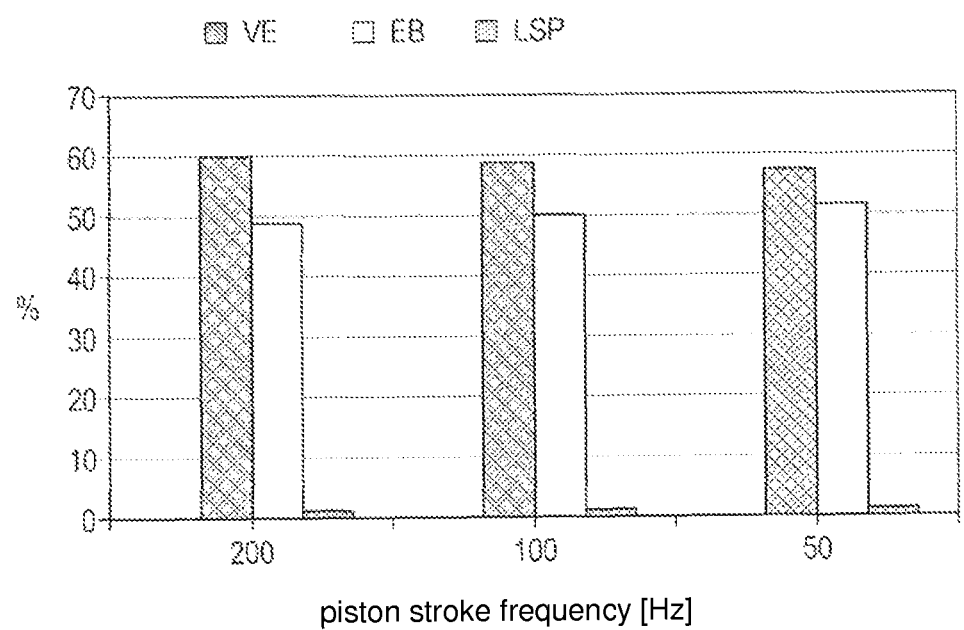
Figure 9:
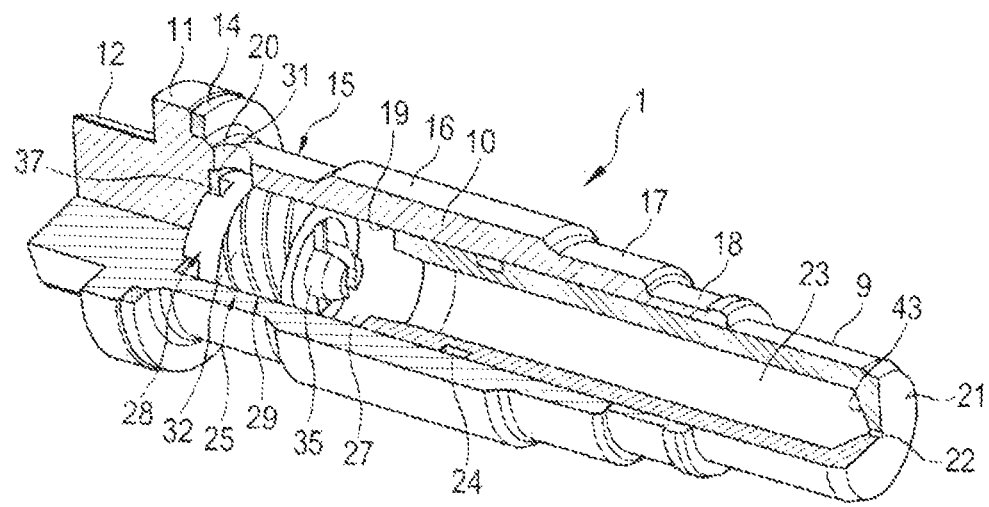
Figure 10:
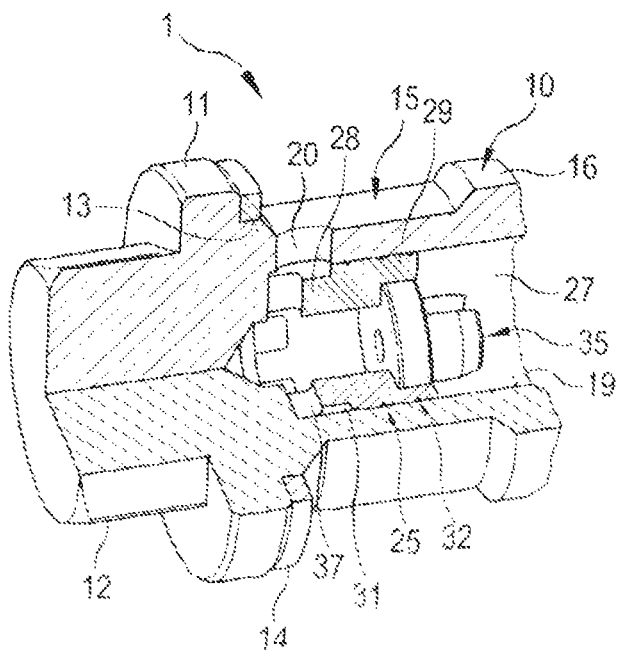
Figure 11:
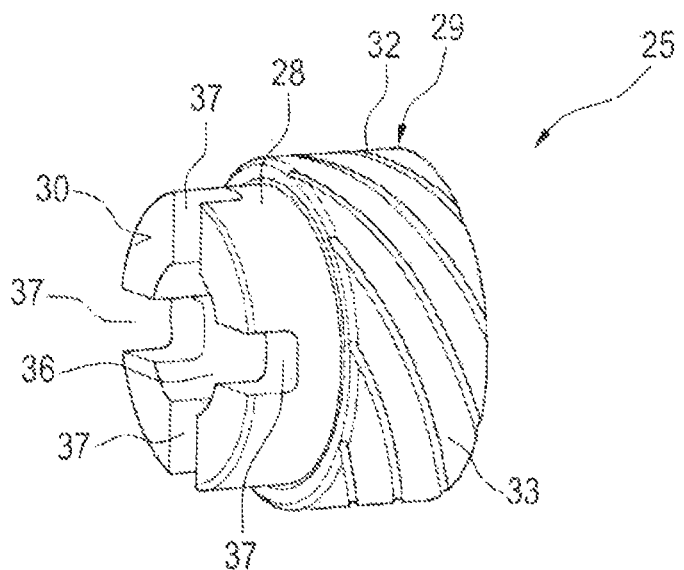
Figure 12:
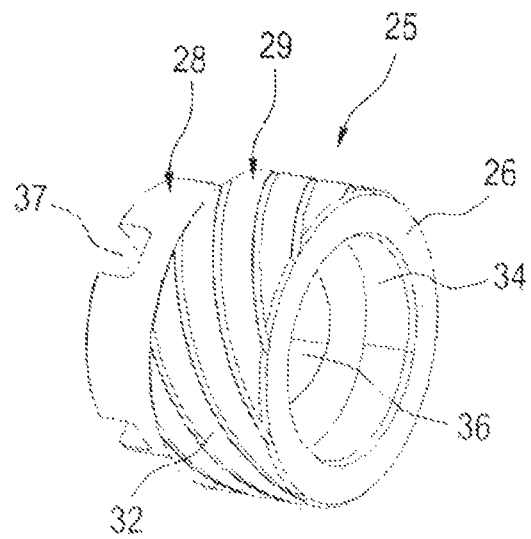

FIG. 6 is now used to explain the distribution of the drainage flow from the pressure reservoir 27 in greater detail based on various piston stroke frequencies (50, 100 and 200 Hz). The abbreviations for this are defined as follows
SI=Supply insert 25
VO=Vent opening 22 and
LG=Leakage gap between tensioning piston 9 and receiving bore 19.

As already explained above, the leakage gap is largely reduced, so that this does not participate significantly in the damping action. Tests have shown that in the present embodiment as much as 0.6% of the drainage flow can flow via the leakage gap. This flow is therefore less than 2%, preferably 1%, of the total flow volume of the drainage flow and should therefore be disregarded as design related for the purposes of this invention.

The diagram clearly shows that the damping share of the supply insert 25 dominates for all three piston stroke frequencies shown. The test generated the following results:

| Stroke frequency [Hz] | SI [%] | VO [%] | LG [%] |
|---|---|---|---|
| 200 | 60.4 | 39.0 | 0.6 |
| 100 | 59.5 | 39.9 | 0.6 |
| 50 | 57.5 | 41.9 | 0.6 |
| average: | 59.1 | 40.3 | 0.6 |

This data shows that as the piston stroke frequency increases, which mostly occurs in conjunction with higher combustion engine RPMs, the share of the damping action by the supply insert 25 increases slightly, whereas the share of the vent opening 22 decreases slightly.

The piston stroke frequency was used as the basis for the tests, because said piston stroke frequency best reflects the dynamic behavior of the tensioning device 1. It would also be possible to conduct an evaluation on the basis of the pressure in the pressure reservoir, or the RPMs of the combustion engine. However, the investigation of various embodiments has shown that the dynamic behavior is best reflected using the piston stroke frequency because this takes into consideration the vibration condition of the timing chain and therefore the condition actually to be damped.

After approx. two-thirds of the drainage flow drains through the damping channels 32, this amount of hydraulic fluid is again readily available for the supply function. This reduces the total throughput of the hydraulic fluid volume through the tensioning device. In conventional embodiments, a significant share would drain to the outside through the leakage gap. The present embodiment provides a reasonable compromise of a functional venting action and the system-related damping action still present by means of the vent opening 22. Moreover, advantages arise due to this damping distribution in regards to the pressure distribution in the pressure reservoir 27.

In regards to the indicated embodiment, mention should also be made of the fact that more than 99% of the volume inflow of hydraulic fluid occurs via the damping grooves 32 and therefore via the supply insert 25. The smaller remaining share is the result of the storage capacity of the minimally present gap between the tensioning piston 9 and the receiving bore 19.

The following shall now explain a second embodiment of the present tensioning device 1 based on FIGS. 9 to 12. The following shall only detail the significant differences to the aforementioned exemplary embodiment, which is why supporting reference is made to the description of the aforementioned embodiment by employing the same reference numbers. In particular, this embodiment again makes use of the compression spring 42 and the packing 38 from FIGS. 6 and 7, which are installed in the pressure reservoir 27. For reasons of clarity, these components are not shown in FIGS. 9 and 10.

The difference can be seen in a different configuration of the supply insert 25. Said supply insert is additionally equipped with a receiving seat 34 on its front face 26, which accommodates a check valve 35. The configuration and functional principle of the check valve 35 are known to the art and are therefore not described in further detail here. The present case employs a ball check valve with a spring pretensioned valve ball. The check valve 35 permits hydraulic fluid inflow into the pressure reservoir 27 and is intended to prevent the drainage flow from the pressure reservoir 27 as best as possible. To facilitate the inflow via the supply insert 25 and the check valve 35, the supply insert 25 is additionally equipped with a centered inflow bore 36 and radial inflow channels 37 along a face 30 that connect the centered inflow bore 36 with the flow gap 31.

Otherwise, all elements are of an identical design to the previously described embodiment.

This different configuration of the supply insert 25 with check valve 35 results in slightly different inflow and drainage flow behavior.

Figure 13:
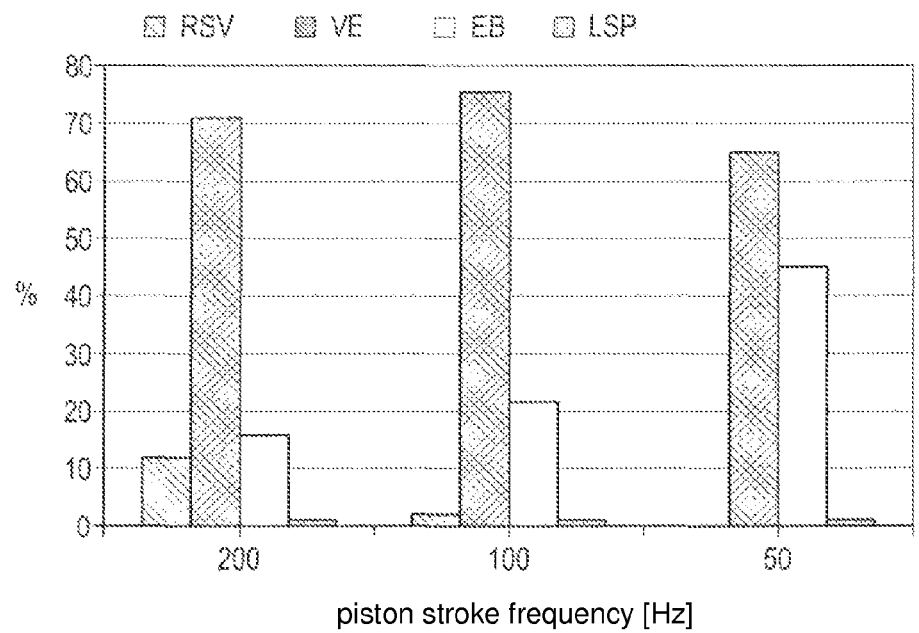

The embodiment shown was also tested at the piston stroke frequencies of 50, 100 and 200 Hz. The diagram in FIG. 13 shows the volume flow distribution of the drainage flow at these piston stroke frequencies. The primary share of the drainage flow again takes place via the damping grooves 32 of the supply insert 25. At a piston stroke frequency of 50 Hz, the tested tensioning device demonstrates a distribution similar to what was already shown with the previous embodiment. During the test, the values for the distribution of the drainage flow were as follows:

| Stroke frequency [Hz] | CV [%] | SI [%] | VO [%] | LG [%] |
|---|---|---|---|---|
| 200 | 12.7 | 70.9 | 15.8 | 0.5 |
| 100 | 2.3 | 75.0 | 22.1 | 0.6 |
| 50 | 0.0 | 64.7 | 34.7 | 0.6 |
| average: | 5.0 | 70.2 | 24.2 | 0.6 |

CV is the abbreviation for the check valve 35.

As the piston stroke frequency increases, the dynamic behavior of the check valve 35 becomes apparent. Initially, the share of the supply insert 25 increases, whereas the share of the valve opening 22 declines (see values for the piston stroke frequency 100 Hz); but now, a share of the drainage flow also starts to drain via the check valve 35. This is caused by the fact that the check valve 35 is no longer able to completely follow at these frequencies. This effect increases as the piston stroke frequency increases (see piston stroke frequency 200 Hz). The share that drains via the check valve 35 continues to increase, which occurs at the expense of the share that drains through the damping channels 32. But the share that drains through the vent opening 22 continues to decline. Here as well, the diagram shows that the majority of the damping action occurs by means of the supply insert 25, thus making a predominant share of the hydraulic oil available for the supply flow without first having to channel the hydraulic oil back to the oil supply. Here as well, the volume flow draining through the small remaining leakage gap does not exceed 0.6% and therefore has no significant influence on the damping properties.

Figure 14:
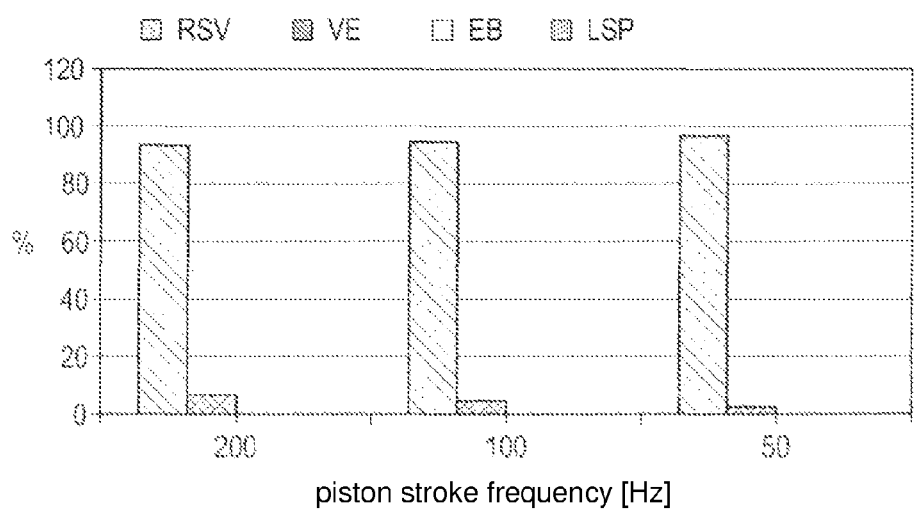

FIG. 14 now shows the inflow of hydraulic fluid at the various piston stroke frequencies for the second exemplary embodiment. The figure shows that the predominant inflow occurs via the check valve 35, where this share declines slightly with increasing piston stroke frequency, whereas the inflow share via the supply insert 25 declines slightly. But the supply insert also always contributes to the inflow, clearly showing that the damping channels 32 are always open in both directions. Due to the large inflow via the check valve 35, the tests were unable to demonstrate an inflow via the venting device and the leakage gap because the flow resistance via the check valve 25 and the damping channels 32, is significantly lower.

Figure 15:
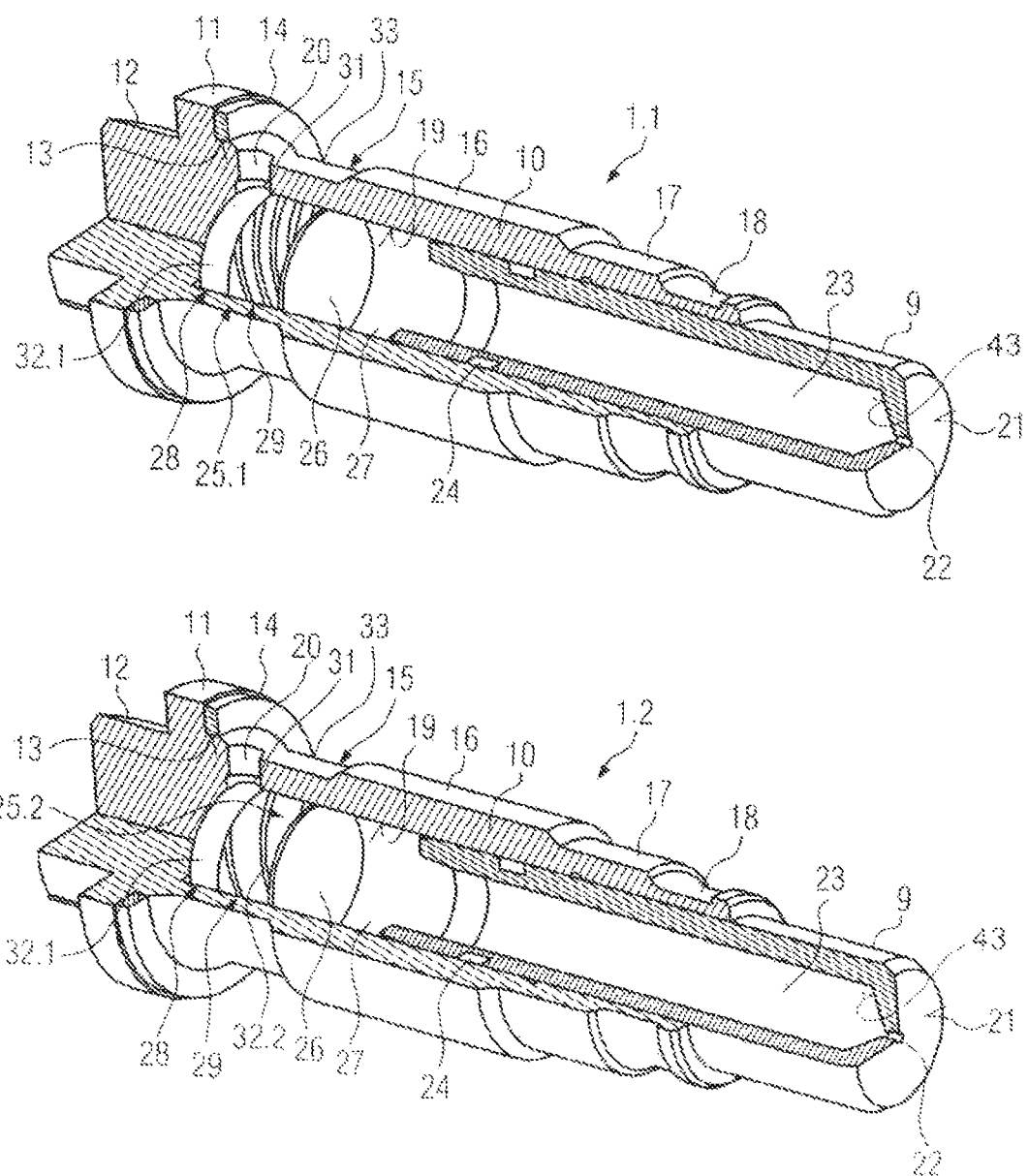

FIG. 15 now shows a tensioning device series. This also involves a chain tensioner, as was shown in the first example embodiment. The upper tensioning device 1.1 has the identical configuration as the tensioning device from FIG. 2. The lower tensioning device 1.2 is also identical in configuration, with the exception of the supply insert 25.2. In this case, the supply insert 25.2 merely has the number of damping grooves 32.2 reduced to a count of 5. This results in a much harder damping characteristic for the lower tensioning device 1 because less hydraulic fluid can be forced back from the pressure reservoir 27 in one stroke. FIG. 14 shows a tensioning device series on the basis of the second example embodiment. Here as well, merely the number of damping channels 32.1 and 32.2 differs, whereas all other components of the two tensioning devices 1.1 and 1.2 shown are otherwise identical.

Figure 16:
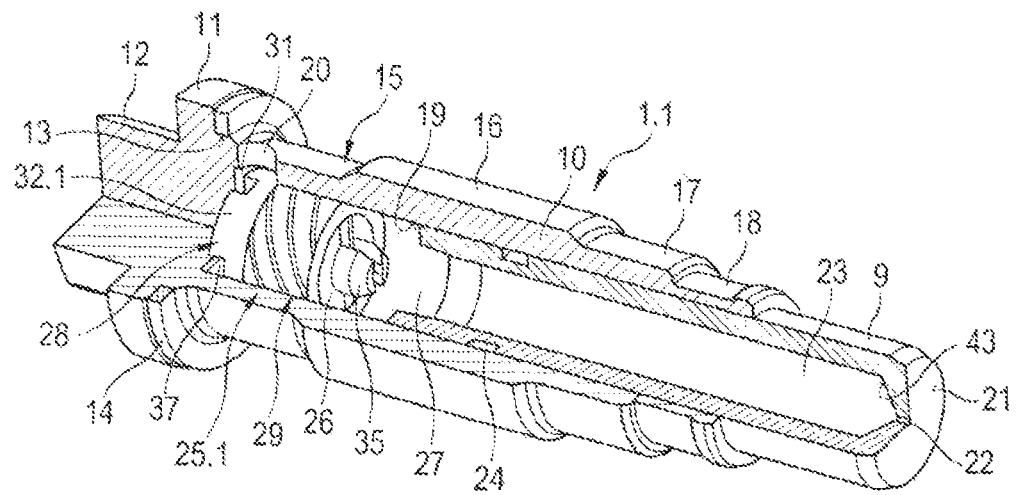
Figure 16:
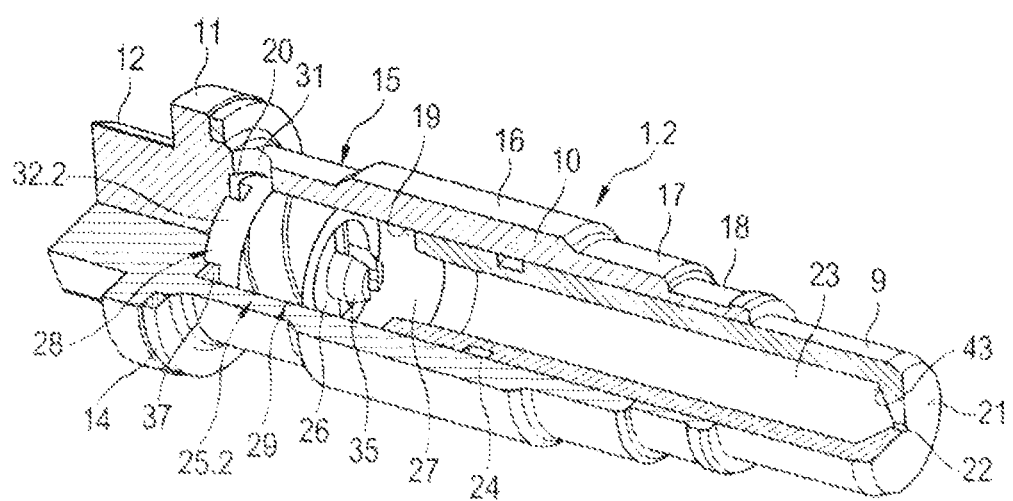

For reasons of clarity, FIGS. 15 and 16 each do not show the compression spring 42 (see FIG. 6) and the packing 38 (see FIG. 7). These components are of course arranged in the pressure reservoir 27.

The configuration also shows that merely exchanging the supply insert (potentially with check valve) can attain such a variation in the damping properties. All other components and dimensions can remain the same. A variety of shapes can be employed, thus providing for a very large number of different options to achieve a variety of damping properties.

Figure 17:
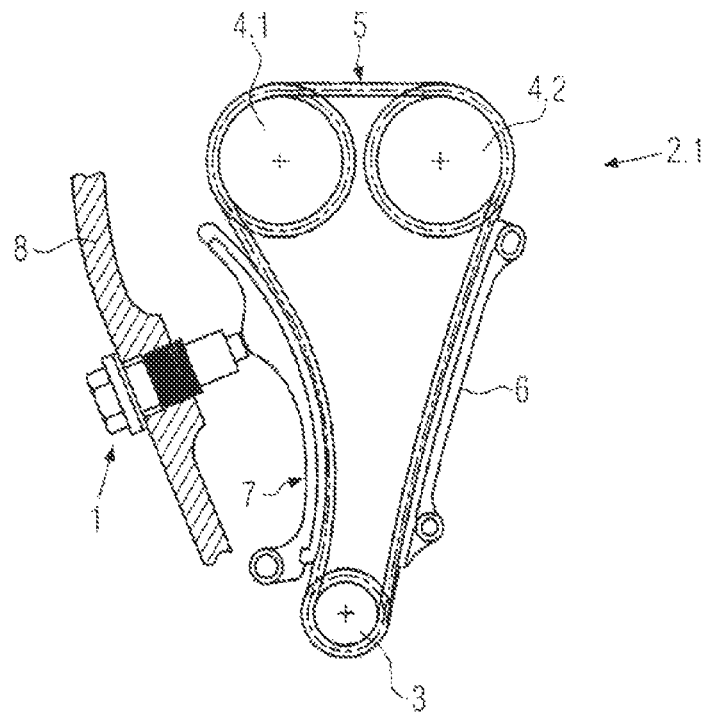
Figure 17:
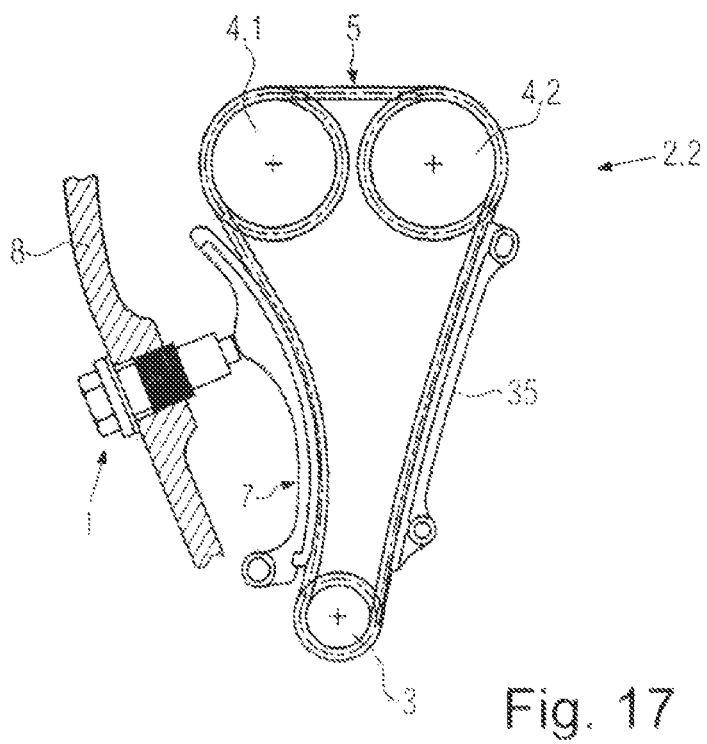

FIG. 17 schematically shows a first chain drive 2.1 (shown above) and a second chain drive 2.2 (shown below). The two chain drives differ solely by the fact that the upper chain drive is equipped with the tensioning device 1.1 from FIG. 15 or 14, and the lower chain drive 2.2 is equipped with the tensioning device 1.2 from FIG. 15 or 16. This creates a chain drive series that merely differs by using a variety of tensioning devices 1. However, it is also possible to use other differing elements within a series, in addition to the differing tensioning devices 1.1 and 1.2. On the whole, a cost reduction can be achieved due to the reduced number of parts.

The invention claimed is:

1. A tensioning device for a flexible drive device, such as a chain or belt, comprising:
   a housing,
   a tensioning piston that is arranged in a sliding manner in the housing,
   a pressure reservoir for hydraulic fluid that is formed between the housing and the tensioning piston,
   a fluid supply that is arranged in the housing to supply the pressure reservoir with hydraulic fluid,
   a supply insert that is seated in the housing to prevent movement of the supply insert with respect to the housing, the supply insert forming a damping device that is arranged in the housing and has a physical fluid connection to the pressure reservoir and damps the retracting motion of the tensioning piston, and a venting device that is arranged on the tension piston and has a physical fluid connection to the pressure reservoir, wherein the damping device has at least one damping channel that is open in both flow directions as a component of the fluid supply in such a way that during operation, at least a portion of the supply stream is fed through the at least one damping channel into the pressure reservoir, and wherein the pressure reservoir is located between the damping device and the venting device, the damping device and the venting device being coupled to each other by the pressure reservoir such that a drainage flow from the pressure reservoir occurs via the damping device and the venting device in combination.

2. The tensioning device in accordance with claim 1, wherein the at least one damping channel of the damping device is formed between the supply insert and the housing.

3. The tensioning device in accordance with claim 2, wherein the housing has a receiving bore in which the tensioning piston is accommodated in a sliding manner, and into which the supply insert is seated in a base of the receiving bore, and the at least one damping channel is formed between an exterior surface of the supply insert and an interior surface of the receiving bore.

4. The tensioning device in accordance with claim 2, wherein the supply insert has a first section and a second section, the second section having a larger diameter than then first section, and the at least one damping channel is formed in the second section, and wherein the fluid supply includes a flow gap formed between the first section and the housing.

5. The tensioning device in accordance with claim 4, wherein the housing has a supply bore as a component of the fluid supply, where said supply bore can be connected to an external oil supply and terminates in the flow gap between the housing and the supply insert.

6. The tensioning device in accordance with claim 2, wherein the at least one damping channel runs along the circumference of the supply insert in a helical manner.

7. The tensioning device in accordance with claim 2, wherein the supply insert is equipped with at least two damping channels, and the regions between the damping channels form a nearly complete contact seal with the housing.

8. The tensioning device in accordance with claim 2, wherein the supply insert is manufactured from a softer material than the material of the tensioning piston.

9. A tensioning device series, encompassing at least one first and at least one second tensioning device in accordance with claim 2, wherein the first and the second tensioning devices each have a housing bore to locate the tensioning piston and each have a tensioning piston of an identically dimensioned standardized diameter, and wherein damping properties of the damping device of the at least one first tensioning device differ from those of the at least one second tensioning device, where the different damping properties are obtained by means of differently dimensioned and/or designed supply inserts.

10. The tensioning device series in accordance with claim 9, wherein said first tensioning device and said second tensioning device have different damping characteristics, wherein said first tensioning device forms a part of a first circumferential engagement device transmission, and wherein said second tensioning device forms a part of a second circumferential engagement device transmission.

11. The tensioning device in accordance with claim 1, wherein the fluid supply has a check valve that is hydraulically actuated in parallel to the at least one damping channel.

12. The tensioning device in accordance with claim 11, wherein the check valve is configured to supply greater than 90% of a supply stream to the pressure reservoir via the check valve when a tensioning piston stroke frequency is in a range of 50-200 Hz.

13. The tensioning device in accordance with claim 1, wherein flow resistance of the venting device drains no more than 45% of the drainage flow from the pressure reservoir via the venting device when a tensioning piston stoke frequency is in a range of 50-200.

14. The tensioning device in accordance with claim 1, wherein a slip seal is arranged in the housing between the tensioning piston and the receiving bore.

15. A circumferential engagement device transmission with a flexible drive device, such as a chain or belt, at least two drive wheels that are functionally engaged with the drive device, and a tensioning device in accordance with claim 1.

16. The tensioning device in accordance with claim 1, wherein the supply insert has a first section and a second section having a larger diameter than then first section, and wherein the at least one damping channel is formed on the second section in a helical manner.

17. The tensioning device in accordance with claim 16, wherein the housing has a receiving bore in which the tensioning piston is accommodated in a sliding manner, and into which the supply insert is inserted and seated at a base of the receiving bore, and wherein the first section of the supply insert includes a front face in contact with the base of the receiving bore.

18. The tensioning device in accordance with claim 1, wherein the supply insert includes a front face in contact with a base of the housing.

* * * * *

UNITED STATES PATENT AND TRADEMARK OFFICE
CERTIFICATE OF CORRECTION

PATENT NO. : 9,080,643 B2
APPLICATION NO. : 13/725297
DATED : July 14, 2015
INVENTOR(S) : Renzo Perissinotto et al.

It is certified that error appears in the above-identified patent and that said Letters Patent is hereby corrected as shown below:

In the claims:

Column 13, In lines 2-3 of claim 6, "the circumference" should be --a circumference--.

Column 13, In line 3 of claim 7, "the regions" should be --regions--.

Column 13, In line 3 of claim 8, "the material" should be --a material--.

Column 14, In lines 4-5 of claim 13, "stoke frequency is in a range of 50-200" should be --stroke frequency is in a range of 50-200 Hz--.

Column 14, In lines 2-3 of claim 16, "a second section having a larger diameter" should be --a second section, the second section having a larger diameter--.

Signed and Sealed this
Twenty-second Day of March, 2016

Michelle K. Lee
*Director of the United States Patent and Trademark Office*